US009051154B2

(12) United States Patent
Fischer et al.

(10) Patent No.: US 9,051,154 B2
(45) Date of Patent: Jun. 9, 2015

(54) APPARATUS FOR PERFORMING A LOADING TEST IN AN ELEVATOR SYSTEM AND METHOD FOR PERFORMING SUCH A LOADING TEST

(75) Inventors: Daniel Fischer, Aigle (CH); Hanspeter Bloch, Buchrain (CH); Roger Martinelli, Zurich (CH)

(73) Assignee: Inventio AG, Hergiswil (CH)

( * ) Notice: Subject to any disclaimer, the term of this patent is extended or adjusted under 35 U.S.C. 154(b) by 616 days.

(21) Appl. No.: 13/145,693

(22) PCT Filed: Feb. 4, 2010

(86) PCT No.: PCT/EP2010/051337
§ 371 (c)(1), (2), (4) Date: Jul. 21, 2011

(87) PCT Pub. No.: WO2010/089337
PCT Pub. Date: Aug. 12, 2010

(65) Prior Publication Data

US 2011/0283814 A1 Nov. 24, 2011

(30) Foreign Application Priority Data

Feb. 9, 2009 (EP) .................................... 09152385

(51) Int. Cl.
*G01L 1/08* (2006.01)
*B66B 5/00* (2006.01)

(52) U.S. Cl.
CPC .................................. *B66B 5/0093* (2013.01)

(58) Field of Classification Search
USPC .......................................... 73/121; 187/247
See application file for complete search history.

(56) References Cited

U.S. PATENT DOCUMENTS

2002/0100645 A1* 8/2002 Bloch .......................... 187/306
2008/0271954 A1* 11/2008 Fischer ........................ 187/281

FOREIGN PATENT DOCUMENTS

WO 2005066057 A2 7/2005
WO 2007094777 A2 8/2007
WO 2008071301 A1 6/2008

* cited by examiner

*Primary Examiner* — Lisa Caputo
*Assistant Examiner* — Brandi N Hopkins
(74) *Attorney, Agent, or Firm* — Fraser Clemens Martin & Miller LLC; William J. Clemens

(57) ABSTRACT

An apparatus and method for performing a load test in an elevator installation having an elevator car and a counterweight, which are connected to one another by a supporting device, and a drive brake for halting the elevator car during a downwards journey. The apparatus has a connecting element for fastening to the counterweight, an element with spring properties and a tensioning device for installation in the elevator installation. One point of the tensioning means is fixed to a stationary point of the elevator installation via the element with spring properties. Another point of the tensioning means is connected to the counterweight via the connecting element, wherein the tensioning device includes an actuating device with which to tension the element with spring properties in order to thereby exert a downwardly directed tensile stress on the counterweight.

11 Claims, 4 Drawing Sheets

APPARATUS FOR PERFORMING A LOADING TEST IN AN ELEVATOR SYSTEM AND METHOD FOR PERFORMING SUCH A LOADING TEST

FIELD OF THE INVENTION

The invention relates to an apparatus for performing a loading test in an elevator system and a method for performing a loading test in an elevator system.

BACKGROUND OF THE INVENTION

To test the drive-brakes of an elevator system, so-called loading tests are performed. Such loading tests are performed after the installation of an elevator system and also at periodic intervals to test the operating safety.

The state of the art is for elevator systems to have a balance between the elevator car and the counterweight that is less than 50%. This is particularly the case for elevator systems that have only short hoisting heights.

In a loading test, the elevator car must be loaded with 100% of the rated load. Until now, the loading tests are correspondingly performed with a test load in the elevator car. This means that before each test, the elevator car must be loaded with a corresponding test load. The amount of work is therefore relatively large.

Another approach to performing a loading test is described in patent application WO 2008/071301 A1. According to this document, the elevator car is supported in the elevator hoistway. The loading of the elevator car with the test load is thereby obviated. The drive-brakes are partly released so as then to measure the generated force by means of the traction sheave. This measurement takes place on the support of the elevator car. With this operation, a specified overload on the elevator car is created and it is determined whether the unreleased drive-brakes are capable of holding the elevator car. With such an approach the traction sheave can, under certain circumstances, suffer damage. Moreover, according to this approach, it is hardly possible to create reproducible conditions.

SUMMARY OF THE INVENTION

An objective of the invention is therefore to propose an apparatus for performing a loading test in an elevator system according to the manner stated at the outset, with which the disadvantages of the state of the art are avoided. The objective of the invention is also to propose such an apparatus that reduces the outlay that is needed until now to perform a loading test in an elevator system.

Performance of the loading test according to the invention does not necessarily involve only testing of the drive-brakes. With the described and claimed loading test, also other elements and components, in particular safety-relevant elements and components, of an elevator system can also be tested. By means of the present invention, for example, also faulty or damaged mechanical connections, such as bolted or riveted connections, welded seams, and suchlike can be detected.

Important in all of these loading tests is that they can be performed under precisely defined and reproducible conditions. The present invention enables precise and reproducible performance of such tests as required.

The present invention is suitable not only for performing loading tests during commissioning or putting into service, but also for periodic loading tests, or for loading tests that are performed after a maintenance service. Such loading tests can be performed to test safety-relevant functions of an elevator system under loaded conditions.

A further advantage of the invention is that it can be used on various types of elevator.

DESCRIPTION OF THE DRAWINGS

Further details and advantages of the invention are described below in relation to examples and by reference to the drawings.

DETAILED DESCRIPTION OF THE INVENTION

For the drawings and the further description the following applies generally:

- The figures are not to be considered as being to scale.
- Identical or similar, or identically or similarly acting, constructive elements are referenced identically in all of the figures.
- Descriptions such as “right”, “left”, “top”, “bottom” relate to the respective arrangement in the figures.

Figure 1:
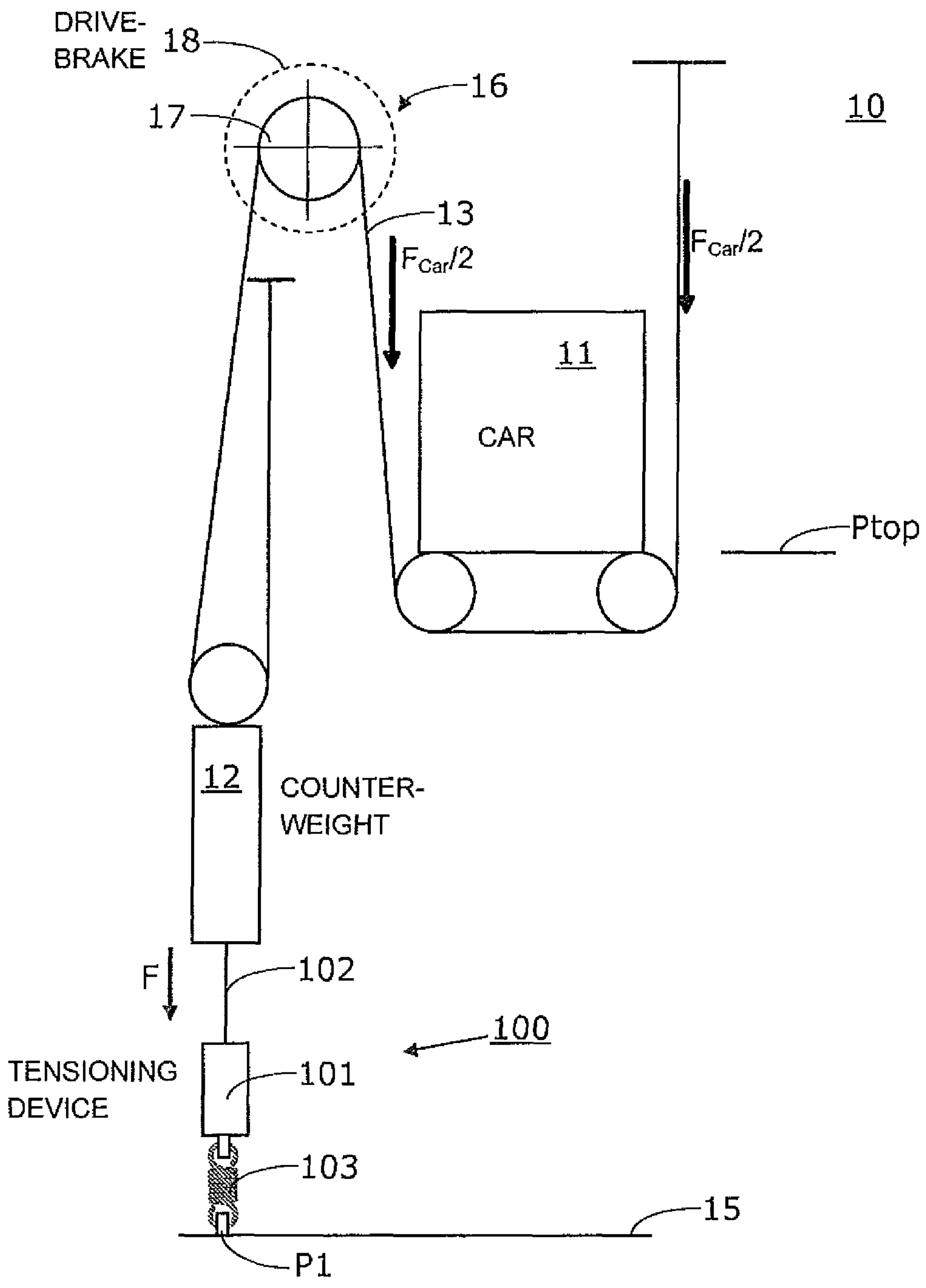
FIG. 1 is a schematic view of an first elevator system from the side.

FIG. 1 shows a first elevator system 10 in which the apparatus 100 according to the invention is employed. The elevator system 10 contains an elevator car 11 and a counterweight 12 which are connected to each other by means of at least one suspension means or device 13. Typically, at least two suspension means 13 are used. The elevator system 10 further contains a drive-brake 18 to allow halting of the elevator car 11 in downward travel. Here, the elevator system 10 has a so-called 2:1 roping arrangement. This creates a simple block-and-tackle with which twice the rated load can be raised at half the speed. In this example, the roping factor UF is UF=2.

In the embodiment of the elevator system 10 shown in FIG. 1, the drive unit 16 contains an electric motor, a traction sheave 17 that is fixed on the shaft of the electric motor, and a drive-brake 18. Details of the drive unit 16 are not shown in FIG. 1. The drive-brake 18 is indicated only diagrammatically.

With a balance of 50% (i.e. B=0.5) between the elevator car 11 and the counterweight 12, the following simplified mathematical relationship (1) applies:

$$G_{cwt}=(G_{ak}+B\cdot G_{NL}) \quad (1)$$

In this equation (1), $G_{cwt}$ is the weight of the counterweight 12, $G_{ak}$ is the unladen weight of the elevator car 11, and $G_{NL}$ the weight of the rated load. This equation (1) states that, with a 50% balance, an equilibrium between the elevator car 11 and the counterweight 12 occurs when the elevator car is loaded with 50% of the rated load.

Figure 2:
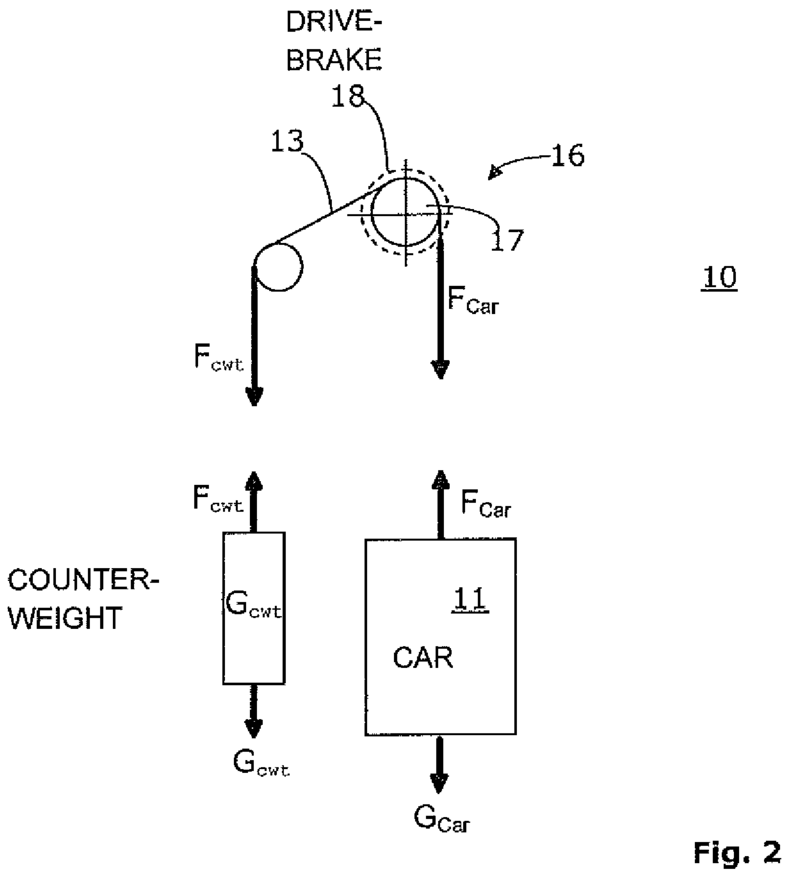
FIG. 2 is a schematic view of a second elevator system from the side.

Shown in FIG. 2 is a further elevator system 10. Here, the elevator car 11 is roped 1:1. In this example, the value of the roping factor UF is UF=1. With a balance of 50% (i.e. B=0.5) between the elevator car 11 and the counterweight 12, the mathematical relationship shown above in equation (1) also applies.

With a balance of 40% (i.e. B=0.4) between the elevator car 11 and the counterweight 12, the following simplified mathematical representation (2) applies:

$$G_{cwt}=(G_{ak}+0.4\cdot G_{NL}) \quad (2)$$

With a 40% balance, the counterweight 12 can hence be somewhat less heavy than with a 50% balance, which particularly in the case of empty trips, and in the case of trips with small car loads, is energetically advantageous.

The total weight of a 50% balance (B=0.5) causes a force $F_{car}$, where $F_{car}=[(G_{ak}+G_{NL})\cdot g]$, which, as indicated in FIG. 2, pulls the suspension means 13 downwards. For g, g=9.81 $m/s^2$ applies. The force $F_{cwt}$ on the counterweight 12 is calculated as follows: $F_{cwt}=[(G_{ak}+0.5\cdot G_{NL})\cdot g]$.

In a state of equilibrium, both the elevator car 11 and the counterweight 12 would be stationary in the elevator hoistway provided that the drive 16 is not switched on. In this special case, the drive-brakes 18 do not need to provide any braking force to maintain this balance.

The principle of the invention will now be explained with a numerical example. If the rated load $G_{NL}$ of the elevator car 11 is $G_{NL}$=800 kg, with a 50% balance and 1:1 roping (i.e. UF=1, as shown in FIG. 2) the loading test must, according to regulations, be performed after the elevator car 11 has been loaded with the full rated load. That is to say, the elevator car 11 would have to be loaded with a rated load of 800 kg.

However, according to the invention, to be able to test the drive-brakes 18 with the same load conditions, the procedure is as follows. With an unladen car 11 ($G_{NL}$=0 kg) the following equations apply:

$$G_{car}=(G_{ak}+0) \quad (3)$$

$$G_{cwt}=(G_{ak}+0.5\cdot G_{NL}) \quad (4)$$

In this situation, the equations (3) and (4) result in a weight difference of $\Delta G1=0.5\cdot G_{NL}$.

With a fully loaded elevator car 11 ($G_{NL}$=800 kg), the following equations apply:

$$G_{car}=(G_{ak}+G_{NL}) \quad (5)$$

$$G_{cwt}=(G_{ak}+0.5\cdot G_{NL}) \quad (6)$$

Also in this situation, the equations (5) and (6) result in a weight difference of $\Delta G2=0.5\cdot G_{NL}$. Thus, between an empty and a full elevator car 11, the same difference $\Delta G2=\Delta G1$ results.

If the rated load $G_{NL}$ of the elevator car 11 is $G_{NL}$=800 kg, and a 40% balance with 1:1 roping (i.e. UF=1, as shown in FIG. 2) is specified, then with an empty elevator car 11 ($G_{NL}$=0 kg), the following equations apply:

$$G_{car}=(G_{ak}+0) \quad (7)$$

$$G_{cwt}=(G_{ak}+0.4\cdot G_{NL}) \quad (8)$$

In this situation, the equations (7) and (8) result in a weight difference of $\Delta G1=0.4\cdot G_{NL}$=320 kg.

With a fully loaded elevator car 11 ($G_{NL}$=800 kg), the following equations apply:

$$G_{car}=(G_{ak}+G_{NL}) \quad (9)$$

$$G_{cwt}=(G_{ak}+0.4\cdot G_{NL}) \quad (10)$$

Also in this situation, the equations (9) and (10) result in a weight difference of $\Delta G2=0.6\cdot G_{NL}$=480 kg.

Thus, between an empty and a full elevator car 11, a difference $\Delta G2-\Delta G1$=160 kg results.

To now be able to perform a loading test with a 40% balance (B=0.4) without needing to load the elevator car 11 with the full rated load $G_{NL}$=800 kg, it is sufficient to apply to the counterweight 12 an additional force F that pulls the counterweight 12 downwards. This force must be set to F=160 kg.

Following below, the same principle is described in relation to the elevator system with 2:1 roping (UF=2) shown in FIG. 1. The total weight of an elevator car 11 that is operated with a 50% balance causes a force $F_{car}$, where $F_{car}=[(G_{ak}+G_{NL})\cdot g]/UF$, which, as indicated in FIG. 1, pulls the suspension means 13 downwards. The force $F_{cwt}$ on the counterweight 12 is calculated as follows: $F_{cwt}=[(G_{ak}+0.5\cdot G_{NL})\cdot g]/UF$.

Between an empty and a full elevator car 11, a corresponding application of the above equations results in the same difference $\Delta G2=\Delta G1=G_{NL}/4$=200 kg.

The total weight of an elevator car 11 driven with a 40% balance causes a force $F_{car}$, where $F_{car}=[(G_{ak}+G_{NL})\cdot g]/UF$, which, as indicated in FIG. 1, pulls the suspension means 13 downwards. The force $F_{cwt}$ on the counterweight 12 is calculated as follows: $F_{cwt}=[(G_{ak}+0.4\cdot G_{NL})\cdot g]/UF$. Between an empty and a full elevator car 11, a corresponding application of the above equations results in a difference $\Delta G2-\Delta G1=0.3\cdot G_{NL}$=240 kg.

To now be able to perform a loading test with a 40% balance (B=0.4) without needing to load the elevator car 11 with the full rated load $G_{NL}$=800 kg, it is also sufficient to apply to the counterweight 12 an additional force F that pulls the counterweight 12 downwards. This force must be set to F=240 kg.

With elevator cars 11 that operate with a balance of less than 50%, a loading test can be performed by application of a corresponding tensile force F to the counterweight 12.

This approach according to the invention for performing loading tests can be used for various testing purposes, for example to test the safety-relevant elements of the elevator system 10. Following below, the test of the drive-brakes 18 as a particularly preferred example of a loading test is described in greater detail.

Figure 3:
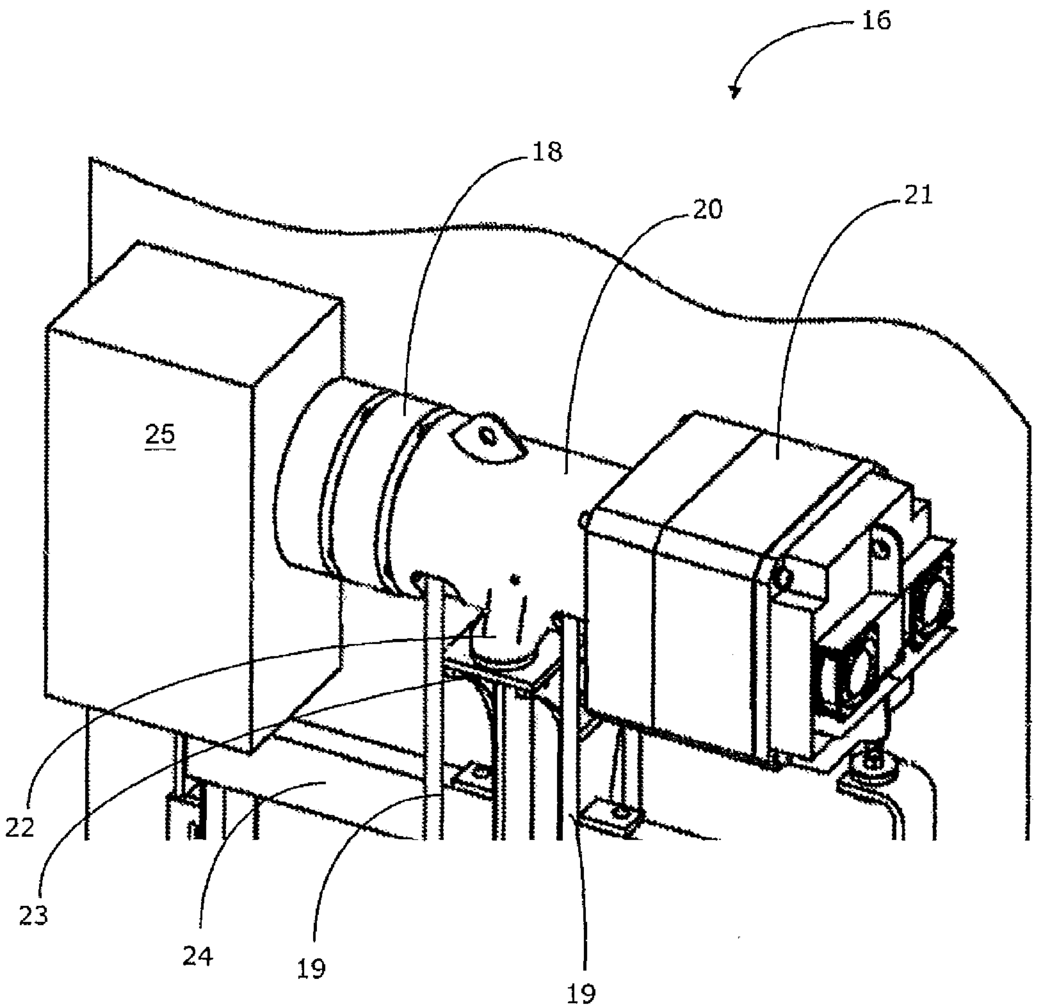
FIG. 3 shows details of a further elevator system in a perspective view.

FIG. 3 shows the example of a drive unit 16 which is supported on guide rails and here drives two flat belts 19 as suspension and driving means. The drive unit 16 is a gearless drive unit with a traction sheave 17 (here not visible) which is arranged in a housing 20, an electric motor 21, and a drive-brake 18. In this embodiment, by means of two machine feet 22 (visible is the front machine foot 22) the housing 20 rests on a console 23 of a supporting frame 24. Here, the electric motor 21 is also supported on the supporting frame 24. A control 25 controls the electric motor 21 and the drive-brake 18, and supplies the electric motor 21 and the drive-brake 18 with electrical energy.

A drive-brake 18 typically has two, three, or more brake circuits. Each of the brake circuits actuates via a brake caliper or a brake arm one of the brakes of the drive-brake 18. Hereinafter, only dual-circuit drive-brakes 18 with a first brake-half and a second brake-half are described in more detail. The invention can, however, be applied to drive-brakes 18 that have more than only two brake circuits and brakes.

Through actuation of a switch or push-button, for example, a first brake-half of a drive-brake 18 can be opened while the other brake-half of the drive-brake 18 remains closed. Depending on the embodiment of the drive-brake 18 and of the two corresponding brake circuits, through actuation of the switch or push-button one of the two brake circuits is opened. The other brake circuit remains thereby unaffected. That is to say, the raised brake-half is open and exerts no braking force. However, the other brake-half is active and exerts braking forces.

Instead of operating the drive-brake 18 by means of a switch or push-button, in some embodiments of drive-brakes 18 it is possible to mechanically block a first one of the brake-halves with a securing pin while the second brake-half is active. Through removal of the securing pin and insertion of the securing pin in another position, the second brake-half can subsequently be mechanically blocked while the first brake-half is active. However, this approach requires a manual intervention to the drive-brake 18, which typically is arranged in the elevator hoistway.

According to the invention, an apparatus 100 for performing a loading test in the elevator system 10 as illustrated diagrammatically in FIG. 1 is employed. The apparatus 100 comprises a connecting element 102 for temporary fastening to the counterweight 12, an element with spring properties 103, and a tensioning device 101. A rope, belt, strap, rod, etc., or also an eye with hooks, or similar fastening means, can, for example, serve the as connecting element 102. The connecting element 102 can also be a component of the element with spring properties 103. In this special case, no separate connecting element 102 is required. Preferably, as shown in the figures, a tension spring can be employed as the element with spring properties 103. The elements 101, 102, and 103 are designed for installation in the elevator system 10. During installation, a point of the tensioning device 101 is fixed over the element with spring properties 103 at a stationary point P1 of the elevator system 10. Another point of the tensioning device 101 is connected via the connecting element 102 with the counterweight 12. The tensioning device 101 contains actuation means 104, which allow the former to tension the element with spring properties 103 so as to thereby exert a downwardly-directed tensile force F on the counterweight 12.

The apparatus 100 is now tensioned in such manner that it exerts a force F which is determined according to the equations stated above. The force F is so set that load conditions occur that would also occur in a loading test with fully loaded elevator car 11, If the force F is exerted by the apparatus 100, the elevator car 11 must maintain the momentary position in the elevator hoistway (e.g. the topmost position Ptop) with only one active brake circuit, even though a large additional upwardly-directed tension force F is exerted on the elevator car 11 by the apparatus 100. Through actuation of the switch or push-button, or through repositioning of the securing pin, this operation can then be repeated for the second brake circuit. In this manner, through application of the tensile force F, the load conditions required for a loading test can be set for an elevator system unproblematically and reproducibly. Then, for example, as described, a loading test of the drive-brake 18 is performed. If the drive-brake 18 is able to hold the position of the elevator car 11, the drive-brake is in order.

The procedure for the loading test to test other elements or components of the elevator system is similar.

It should be noted here that the apparatus 100 need not necessarily be arranged between an underside of the counterweight 12 and a point P1 on the hoistway floor 15. The apparatus 100 can also be arranged between the counterweight 12 and a hoistway wall, or between the counterweight and a guiderail of the elevator system 10. Important is that the arrangement of the apparatus 100 takes place in such manner that it not only finds a stable application point (e.g. the point P1 in FIG. 1) to absorb the forces that occur, but can also be actuated either manually or via a corresponding (electromagnetic) control unit.

Figure 4:
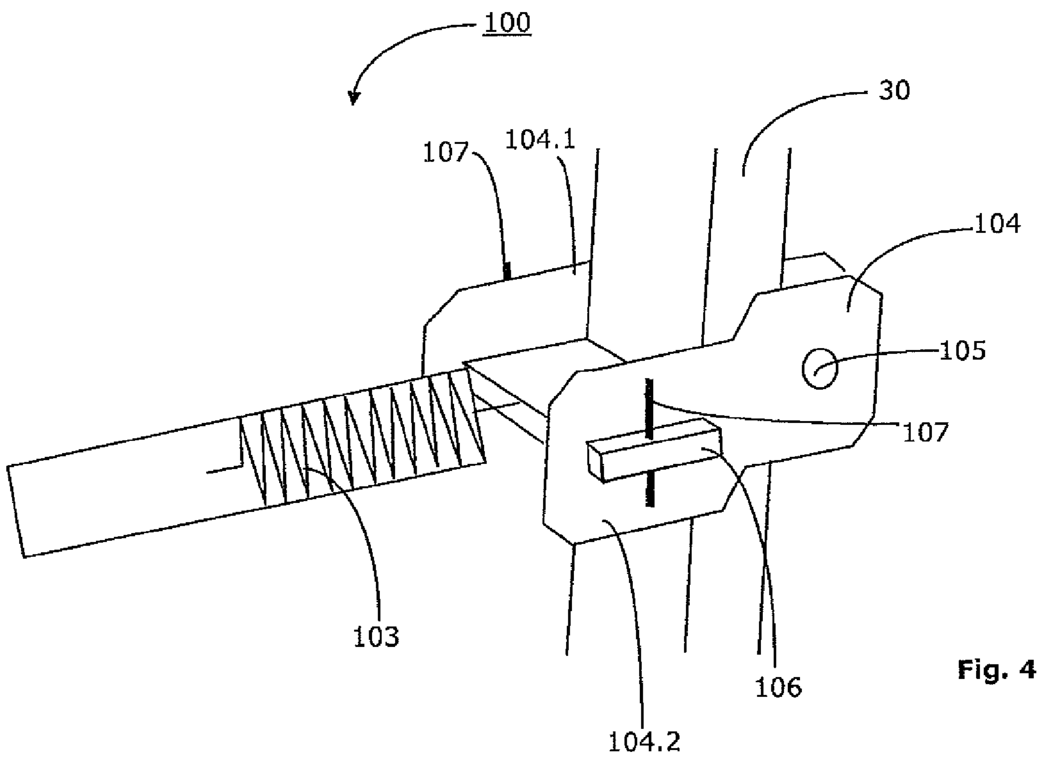
FIG. 4 shows details of an apparatus according to the invention in a perspective view.

In FIG. 4, details of an embodiment of the apparatus 100 are shown which allow a mechanical connection to be created between the tensioning device 101 and a stable application point (as stationary point in the elevator system 10) on a guiderail 30. Here, the element with spring properties 103 is temporarily fastened by means of an application element 104 at a suitably high position on the guiderail 30. When viewed from above, the application element 104 has a U-shaped form. Mounted on the rear side is a pin or bolt 105 which connects two side legs 104.1, 104.2 of the application element 104 together on the rear side. On the front side of the guiderail 30, a connecting plate 106 is inserted through two slits in the side legs 104.1, 104.2, as shown in FIG. 4. This connecting plate 106 can be fixed by two splints 107 or by equally acting means. The element with spring properties 103 is hung into the connecting plate 106, or is connected with this connecting plate 106. On actuation of the apparatus 100, or to be more accurate, on actuation of the tensioning device 101, in the embodiment shown, a horizontal tensile force is exerted on the element with spring properties 103.

Figure 5:
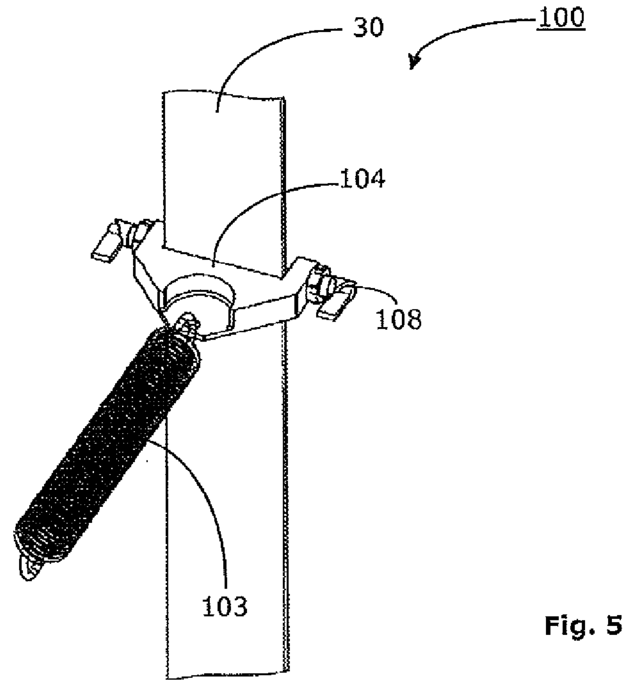
FIG. 5 shows details of a further apparatus according to the invention in a perspective view.

Shown in FIG. 5 are details of a further embodiment of the apparatus 100 which allow a mechanical connection between the tensioning device 101 and a stable application point (as stationary point in the elevator system 10) to be created on a guiderail 30. Here, the element with spring properties 103 is temporarily fastened by means of an application element 104 at a suitably high position on the guiderail 30. Viewed from above, the application element 104 has a U-shaped form. Provided on the side of the application element 104 that faces towards the back is a rectangular opening. The application element 104 is applied to the guiderail 30 with this opening. Arranged on two legs of the application element 104 are screw elements, elements with spring properties, tension springs, bayonet elements 108, or similar elements. These elements 108 can engage by manual actuation behind the guiderail 30 so as to fasten the application element 104. In the embodiment shown, on actuation of the tensioning device 101 a horizontal tensile force is exerted on the element with spring properties 103.

According to a particularly preferred embodiment of the invention, a force-measuring element is used as part of the apparatus 100 to make it possible to read out the magnitude of the momentary tensile force F. Usable as force-measuring element are, for example, a load-measuring cell, a spring balance or scale, or other measuring apparatus, which in each case has a display or a pointer with scale.

In a particularly preferred embodiment, the tensioning device 101 contains a block-and-tackle which is provided with actuation means for manual actuation. Through the exertion of light actuation forces, and through the effect of the block-and-tackle, the necessary tensile force F can be applied.

In a particularly preferred embodiment, the apparatus 100 is provided as a test kit which is designed for temporary installation in the elevator system 10.

The invention acts on the elevator system 10 and its components and elements as if the elevator car 11 were loaded with a rated load $G_{NL}$. Only the immediate effect that the rated load $G_{NL}$ has, for example, on the car floor is eliminated by the test according to the invention. According to the invention, intelligent use is made of the principle of action and reaction in that a corresponding tensile force F acts on the counterweight 12 instead of a tensile force being generated by the deployment of testing weights in the elevator car 11.

Through the invention, a conventional loading test is simulated simply and reproducibly without bringing weights into the elevator car 11.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An apparatus for performing a loading test in an elevator system that includes an elevator car and a counterweight which are connected to each other by a suspension device for movement by a drive unit, the elevator system including a drive-brake to allow halting of the elevator car in downward travel, comprising:

a spring element with spring properties; and a tensioning device for installation in the elevator system, whereby when a point of the tensioning device is fixed via the spring element to a stationary point of the elevator system, and another point of the tensioning device is removably connected via a connecting element to the counterweight that is connected to the elevator car by the suspension device for movement by the drive unit, the connecting element disposed between and temporarily fastening the tensioning device and the counterweight for performing the loading test, the tensioning device includes an application element for tensioning the spring element so as to exert a downwardly-directed tensile force on the counterweight to pull the counterweight downwards for load testing the elevator system.

2. The apparatus according to claim 1 wherein the stationary point is located on one of a hoistway floor of the elevator system, a hoistway wall of the elevator system, and a guiderail of the elevator system.

3. The apparatus according to claim 1 wherein the tensioning device is a block-and-tackle with the application element.

4. The apparatus according to claim 1 including a force-measuring element for ascertaining a magnitude of the tensile force.

5. The apparatus according to claim 1 wherein the spring element and the tensioning device form a test kit adapted for temporary installation in the elevator system.

6. A method for performing a loading test in an elevator system that includes an elevator car and a counterweight connected by a suspension device for movement by a drive unit comprising the steps of:

providing a tensioning device including an application element for tensioning a spring element with spring properties included in the tensioning device;

removably connecting the tensioning device to the counterweight that is connected to the elevator car by the suspension device for movement by the drive unit via a connecting element;

actuating the tensioning device to exert on the counterweight a downwardly-directed tensile force by the spring element to pull the counterweight downwards for load testing the elevator system; and performing a component test on the elevator system while the force is exerted.

7. The method according to claim 6 wherein the performance of the component test comprises the following steps:

performance of a brake test by release of a first brake of a drive-brake of the elevator system wherein during this brake test the elevator car is unladen and a second brake of the drive-brake is active; and testing whether, after release of the first brake of the drive-brake, the elevator car maintains a position in a hoistway of the elevator system.

8. The method according to claim 7 wherein the brake test is a first brake test and including performing the following steps:

performance of a second brake test by releasing the second brake of the drive-brake of the elevator system wherein during this second brake test the elevator car is unladen and the first brake of the drive-brake is active; and testing whether, after release of the second brake of the drive-brake, the elevator car maintains the position.

9. The method according to claim 7 including performing the following steps before performance of the brake test:

installing the tensioning device in the elevator system;

applying the tensile force through actuation of the tensioning device so that in the elevator system a same loading conditions prevail as with a 100% car load of the elevator car.

10. The method according to claim 9 wherein before installation of the tensioning device, moving the elevator car into an upper hoistway position.

11. The method according to claim 6 wherein through the downwardly-directed tensile force that is exerted on the counterweight, an effective weight of the counterweight is increased before performance of a component test or a brake test.

* * * * *